(12) United States Patent
Pikes et al.

(10) Patent No.: US 11,463,759 B2
(45) Date of Patent: Oct. 4, 2022

(54) VIDEO STREAM TRANSMISSION METHOD AND SYSTEM

(71) Applicant: IMAGE ANALYSER LTD., Gloucester (GB)

(72) Inventors: Crispin Pikes, Hampshire (GB); Randhir Shinde, Pune (IN)

(73) Assignee: Image Analyser Ltd., Gloucester (GB)

( * ) Notice: Subject to any disclaimer, the term of this patent is extended or adjusted under 35 U.S.C. 154(b) by 221 days.

(21) Appl. No.: 14/758,057

(22) PCT Filed: Mar. 24, 2014

(86) PCT No.: PCT/GB2014/050918
§ 371 (c)(1),
(2) Date: Jun. 26, 2015

(87) PCT Pub. No.: WO2015/033095
PCT Pub. Date: Mar. 12, 2015

(65) Prior Publication Data
US 2015/0350708 A1    Dec. 3, 2015

(30) Foreign Application Priority Data

Sep. 5, 2013 (GB) .................................. 1315858

(51) Int. Cl.
*H04N 21/2668* (2011.01)
*H04N 21/222* (2011.01)
(Continued)

(52) U.S. Cl.
CPC ......... *H04N 21/2668* (2013.01); *G06V 20/41* (2022.01); *H04N 21/222* (2013.01);
(Continued)

(58) Field of Classification Search
CPC .......... H04N 21/222; H04N 21/23418; H04N 21/2407; H04N 21/2668; H04N 21/440088; H04N 21/4542
(Continued)

(56) References Cited

U.S. PATENT DOCUMENTS

| | | | | |
|---|---|---|---|---|
| 5,732,239 A | * | 3/1998 | Tobagi | G06F 3/061 |
| | | | | 348/E5.008 |
| 2002/0116629 A1 | * | 8/2002 | Bantz | G06Q 30/02 |
| | | | | 726/26 |

(Continued)

FOREIGN PATENT DOCUMENTS

WO    WO 2007/140831    12/2007

OTHER PUBLICATIONS

International Search Report for PCT/GB2014/050918, dated Jun. 12, 2014, 5 pages.
(Continued)

*Primary Examiner* — Nasser M Goodarzi
*Assistant Examiner* — Jaycee Imperial
(74) *Attorney, Agent, or Firm* — Nixon & Vanderhye, P.C.

(57) ABSTRACT

The present invention relates to a method of transmitting a video stream, including: intercepting a video stream from a server to a video client; wherein the video client is on a user device; throttling onwards transmission of the video stream to the video client; analysing content within the video of the video stream; and performing an action in relation to the onward transmission to the video client as a result of the analysis of the content; wherein the throttling continues during analysis of the content. A system and software for transmitting a video stream are also described.

29 Claims, 2 Drawing Sheets

(51) Int. Cl.
    *H04N 21/234* (2011.01)
    *H04N 21/454* (2011.01)
    *H04N 21/24* (2011.01)
    *H04N 21/44* (2011.01)
    *G06V 20/40* (2022.01)

(52) U.S. Cl.
    CPC ... *H04N 21/23418* (2013.01); *H04N 21/2407* (2013.01); *H04N 21/44008* (2013.01); *H04N 21/4542* (2013.01); *G06V 20/44* (2022.01)

(58) Field of Classification Search
    USPC .......................................................... 725/127
    See application file for complete search history.

(56) References Cited

U.S. PATENT DOCUMENTS

| | | | |
|---|---|---|---|
| 2003/0012399 A1* | 1/2003 | Wu | H04N 7/163 382/100 |
| 2006/0005218 A1 | 1/2006 | Kroeger et al. | |
| 2007/0058730 A1 | 3/2007 | Bowra | |
| 2008/0019388 A1 | 1/2008 | Harmon et al. | |
| 2008/0313687 A1* | 12/2008 | Rajakarunanayake | H04N 21/2343 725/110 |
| 2010/0063992 A1* | 3/2010 | Ma | G06T 15/005 709/203 |
| 2010/0250703 A1* | 9/2010 | Steadman | G11B 27/034 709/217 |
| 2011/0082946 A1* | 4/2011 | Gopalakrishnan | H04L 65/4084 709/231 |
| 2011/0126256 A1* | 5/2011 | Wang | H04L 12/1863 725/116 |
| 2013/0007223 A1* | 1/2013 | Luby | H04N 21/23106 709/219 |
| 2014/0101292 A1* | 4/2014 | Eriksson | H04L 65/602 709/219 |
| 2014/0223107 A1* | 8/2014 | Sadok | H04N 21/23113 711/136 |

OTHER PUBLICATIONS

Written Opinion of the ISA for PCT/GB2014/050918, dated Jun. 12, 2014, 7 pages.
GB Search Report for GB 1315858.9, dated Apr. 14, 2014, 5 pages.
Fielding, et al., Hypertext Transfer Protocol (HTTP/1.1): Message Syntax and Routing, Internet Engineering Task Force (IETF), Jun. 2014, 89 pages.
European Examination Report dated Apr. 9, 2019, issued in European Application No. 14 715 067.6.

* cited by examiner

VIDEO STREAM TRANSMISSION METHOD AND SYSTEM

This application is the U.S. national phase of International Application No. PCT/GB2014/050918 filed 24 Mar. 2014 which designated the U.S. and claims priority to GB Patent Application No. 1315858.9 filed 5 Deptember 2013, the entire contents of each of which are hereby incorporated by reference.

FIELD OF INVENTION

The present invention is in the field of video transmission. More particularly, the present invention relates to transmission of a video stream to facilitate filtering.

BACKGROUND

Historically web filters have been used to filter pornography on the Internet by blocking websites based on URL blacklists and lexical analysis. These techniques are becoming less effective as the Internet is becoming more dynamic. They also are ineffective at addressing pornographic videos which can be found on media sharing sites that would be considered legitimate by a blacklist filter. Lexical analysis is also ineffective as online videos often have little text associated with them that would indicated the videos contents are pornographic.

One solution to this problem could be to intercept the video stream and analyse the content of the video. However video analysis is time consuming and delaying the video while it is being analysed can be detrimental to the user experience and cause connection problems. Alternatively allowing the video to play during analysis allows the client device to download video data into its buffer much faster than standard playback. Therefore, blocking the video after analysis is completed is ineffective as the video will continue to play on the device until there is no more data in its buffer.

Accordingly, there is a desire for a video stream transmission system which facilitates the analysis and filtering of a video stream from a server to a client device.

It is an object of the present invention to provide a video stream transmission system which overcomes the disadvantages of the prior art, or at least provides a useful alternative.

SUMMARY OF INVENTION

According to a first aspect of the invention there is provided a method of transmitting a video stream, including:

a) intercepting a video stream from a server to a video client on a user device;

b) throttling onwards transmission of the video stream to the video client;

c) analysing content within the video of the video stream; and d) performing an action in relation to the onward transmission to the video client as a result of the analysis of the content;

wherein the throttling continues during the analysis of the content.

The step of interception may occurs at a proxy device between the transmission from the server to the user device. Alternatively, the step of interception may occur at the user device.

The throttling may be caused by introducing a pause into onward transmission. The pause may be introduced before transmission of every block of the video stream. The size of the block may be determined by, at least, the video size and the video length. The size of the block (t) may be calculated by the following formula:

$$t = \frac{s * p}{(l - d)}$$

where
t=Block Size (Bytes)
s=Video Size (Kilobytes)
l=Video Length (Seconds)
d=Delay (Seconds)
p=Pause (Milliseconds)

The length of the delay (d) may be determined by the video length.

The action in step (d) of the method may include one of increasing the throttling of onward transmission of the video stream, decreasing the throttling of onward transmission of the video stream, or blocking onward transmission of the video stream.

During initial interception of the video stream an initial block of a specified size of the video stream may be transmitted onto the video client. The specified size of the initial block may be at least the size of the header of the video.

The step of analysing content may include analysing the content for pornographic content. The action in step (d) of the method may include blocking of the onward transmission of the video stream if the pornographic content as a result of the analysis is determined to exceed a specified threshold.

The analysis may utilise a static image analysis of at least some frames within the video.

The method may further including the step of requesting a second transmission of the video from the server; wherein the analysis may be performed on the content of the video within the second transmission.

According to a further aspect of the invention there is provided a system for transmission of a video stream, including:

a first processor configured to throttle onwards transmission of a video stream to a video client on a user device and to perform an action in relation to the onward transmission to the video client as a result of analysis of content of the video of the video stream; a second processor configured to analyse the content within the video of the video stream; and a communications apparatus configured to intercept the video stream from the server to the video client on the user device;

wherein the first processor is configured to continue throttling of the onward transmission of the video stream during analysis of the content of the video of the video stream by the second processor.

Other aspects of the invention are described within the claims.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

The present invention provides a video stream transmission method and system which facilitates the analysis and filtering of the video stream during transmission from a server to a client.

The inventors have discovered that the problems existing in the prior art can be solved by intercepting the video stream and limiting the flow of the data to the requesting device while video analysis is performed on the visual data. By throttling the data the device's buffer remains only a few seconds ahead of real time playback. If video analysis returns a positive result the video can be blocked and as the device's buffer is empty the video will stop playing shortly thereafter.

In addition the invention can dynamically increase or decrease the throttle based on feedback from the video analysis system.

Figure 1:
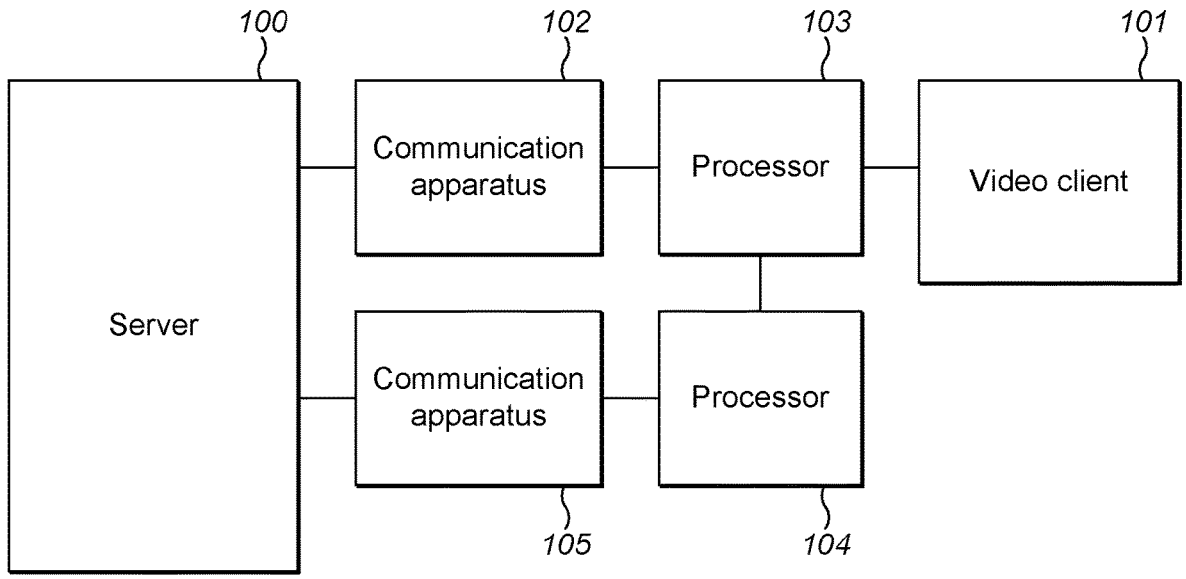
FIG. 1: shows a block diagram illustrating a system in accordance with an embodiment of the invention.

In FIG. 1, a video stream transmission system in accordance with an embodiment of the invention is shown.

A server 100 is shown. The server 100 is configured to deliver video streams in response to requests from clients 101. For example, the server 100 may be a web server receptive to HTTP/HTTPS requests.

A first communications apparatus 102 is shown. The communications apparatus 102 is configured to intercept video streams from the server 100 to a client 101.

A first processor 103 is shown. The first processor 103 is configured to receive the intercepted video stream and to throttle onward transmission of the video stream to a video client 101.

The video client 101 is executing on a user device. The video client 101 may be, for example, a web browser, a plugin within a web browser such as Adobe™ Flash Player or Microsoft™ Silverlight™, or a dedicated video application such as Quicktime™.

The user device may be a general purpose computing device such as a desktop computer, a laptop, a tablet computer, or a smartphone. Alternatively, the user device may be a dedicated video player such as a network-enabled Blu-ray™ player, a network-enabled media player such as an Apple™ TV or Roku™, or a Smart TV, or the user device may be a multifunction device such as a games console.

The first processor 103 may request that the content of the video stream is analysed by a second processor 104. The requests may be made by storing the request within a database accessible to both processors 103 and 104. The database may be collocated with one or other processors 103 and 104, or the database may be remotely located from both processors 103 and 104. In the latter case, the processors 103 and 104 may communicate with the database via a network or combination of networks, such as the Internet.

In one embodiment, a plurality of first processors 103 may communicate via the database with one or a plurality of second processors 104.

The second processor 104 may be configured for analysing the content of the video stream either directly from the first transmission or from a requested second transmission of the video stream. Analysis of the content of the video stream may be performed by static image analysis of one or more frames of the video stream.

The first 103 and/or second 104 processor may exist within the user device itself or may be deployed in a physically separate proxy device. The proxy device may be collocated with the user device, for example, at a router or wireless access point, or may be remotely located at an ISP utilised by the user device or virtually within or across a cloud-based architecture. It will be appreciated that other physical deployments can be envisaged.

A second communications apparatus 105 is shown. In one embodiment, the second communications apparatus 105 is configured to request a second transmission of the video stream from the server 100 for the second processor 104 to analyse.

The first 102 and second 105 communications apparatus may be the same physical apparatus.

The first 103 and second 104 processor may be the same physical processor.

The server 100, the communications apparatuses 102 and 105, and the video client 101 on the user device may communicate across a network or plurality of interconnected networks such as the Internet.

The first processor 103 may transmit onward the video stream to the video client 101 within the user device when the processor 103 exists within the user device, or across a communications channel, a network or plurality of interconnected networks where the first processor 103 is deployed in a physically separate device.

Figure 2:
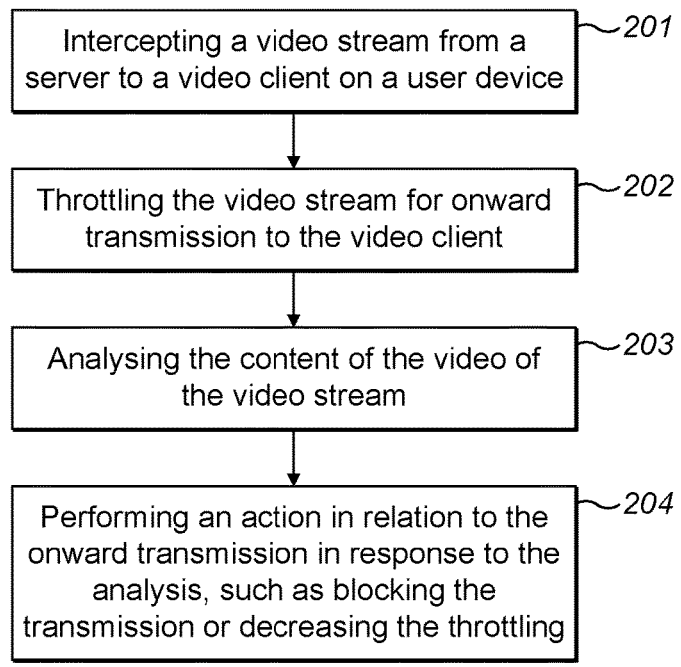
FIG. 2: shows a flowchart illustrating a method in accordance with an embodiment of the invention.

In FIG. 2, a method of video stream transmission in accordance with an embodiment of the invention will be described.

In step 201, a video stream transmission from a server to a video client on a user device is intercepted.

The video stream may have been requested by the video client from the server, for example, by a HTTP/HTTPS request.

In one embodiment, all requests from the user device to servers across the Internet or a network may be intercepted and the nature of the request may be determined. Requests that relate to video streams may trigger interception of data transmitted from servers in response to the requests.

In step 202, the transmission is throttled for onward transmission to the video client.

The transmission may be throttled by pausing before transmitting blocks of the video. The length of the pause may be, preferably, preconfigured or calculated from one or more factors of the video such as the size and length of the video and/or the size of the blocks. The size of the blocks may be, less preferably, preconfigured or calculated from one or more factors of the video such as the size and length of the video and/or the length of the pause. For example, the pause and/or block size could be configured such that playback of the video at the video client does not slow down, but also such that the video client does not locally buffer a significant quantity of the video.

In one embodiment, before throttling of onward transmission of the video, an initial block of the video stream may be transmitted to the video client. The size of the initial block may be of a size to ensure that the entire header of the video is transmitted to the video client. Certain types of video clients may drop the connection if the entire header is not received quickly during a video stream. Transmitting an initial block may, therefore, prevent these video clients from dropping the connection. The size of the header of a video may not be uniform. Therefore, in one embodiment, the size of the initial block may be predefined to a size sufficiently large to cover, at least, most videos. Alternatively, the size of video headers tend to be correlated to video size, therefore, the size of the initial block may be dynamically calculated based upon the size of the video.

In one embodiment, before throttling the video stream, metadata relating to the video is first searched within a database of prior analysed videos. If the video has already been analysed, the process may skip directly to step 204 and the action may be performed on the basis of the prior analysis. The metadata may be the URI (Uniform Resource Identifier) for the video.

In step 203, content of the video is analysed.

Preferably, the transmission is throttled during analysis of the content of the video.

The video may be analysed for pornographic content.

The content may be extracted from the received video stream. More preferably, a request is made for a second transmission of the video. This may provide an advantage of enabling faster transmission of the video if the request is made from an apparatus with a faster connection to the server or if the request indicates that the video is to be transmitted faster—for example if a lower quality version of the video could be transmitted. The request may relate to transmission of chunks of the video. The chunks may be non-contiguous and may be from across the length of the video. Non-contiguous chuck transmission may provide an advantage by permitting assessment of the entire video quickly.

In step 204, as a result of that analysis, an action is performed in relation to the onward transmission of the video stream.

For example, if the content of the video is deemed by the analysis to exceed a specific pornographic threshold, the throttling may be increased or the transmission may be blocked, and if the content is deemed by the analysis not to exceed a specific pornographic threshold, the throttling may be decreased or removed entirely.

In one embodiment, the video stream may be replaced by another video stream. For example, a video stream indicating that the content is being blocked.

Figure 3:
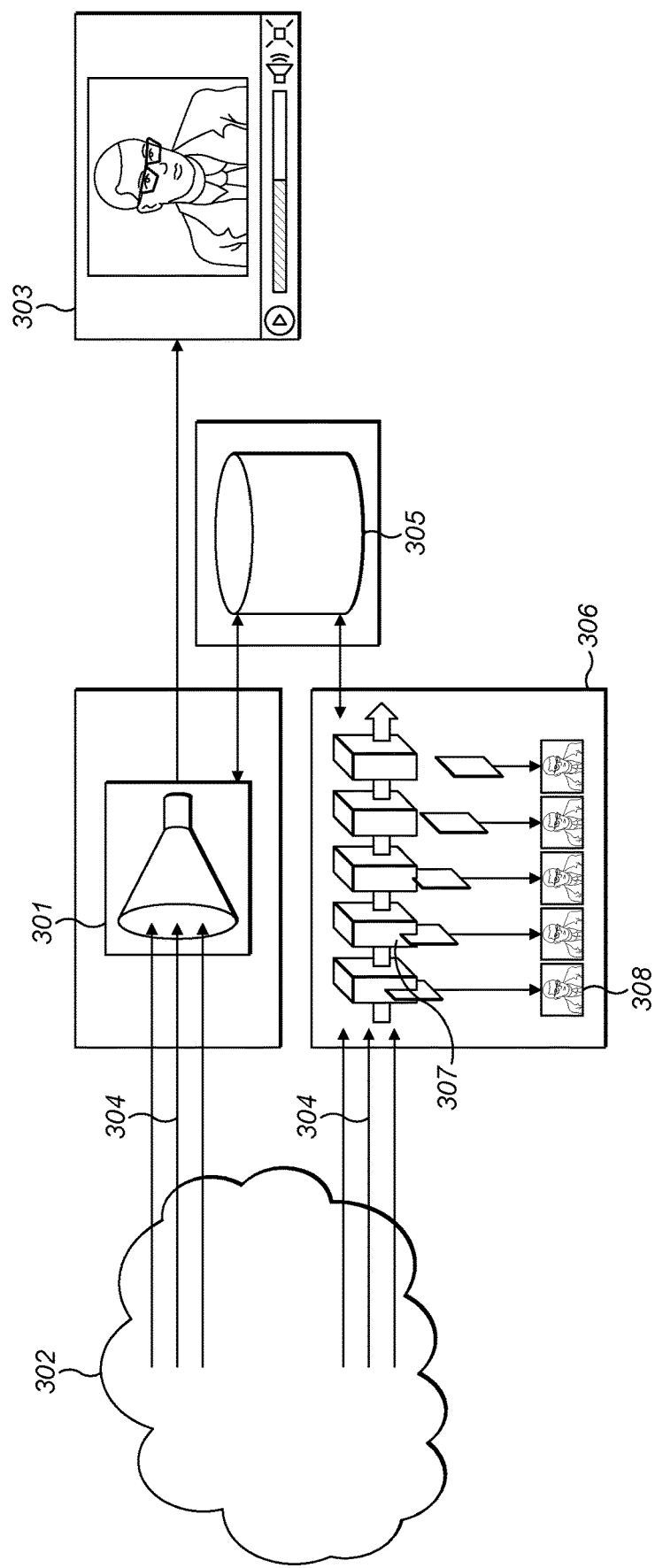
FIG. 3: shows a block diagram illustrating a system in accordance with an embodiment of the invention.

In FIG. 3, an embodiment of the invention will be described.

A Video Throttling (VT) Proxy Server 301 listens on a port for web requests to web servers accessible via the Internet 302 or a network from a browser 303 or device. The proxy server 301 intercepts the responses 304 to each request to identify whether they contain video data. If no video data is identified the response is sent to the requesting browser 303 or device. If the response 304 contains video data then the VT proxy 301 performs a look up of the video URI in a URI database 305. If the URI is not present in the database 305 then it will be added and the status set to Waiting To Be Scanned. If the URI is present in the database 305 and the status is Scanning Complete it will check the result and take action based upon the result. If the URI is present in the database 305 and the status is Scanning In Progress then the VT Proxy 301 will start throttling the data.

The VT Proxy 301 sends an initial 1000 bytes of data to the requesting browser 303 or device to ensure the request does not time-out. The number of initial bytes is configurable. For example, the number of initial bytes may be configured to ensure that the header for the video (including metadata information), which is typically streamed before the video content, is entirely transmitted to the browser 303.

The VT Proxy 301 then polls the database 305 periodically for the video length. This information is added to the database 305 by a Video Rating System 306. When the information is available the VT Proxy 301 then calculates the throttling rate which is the number of bytes to be sent after a specified pause. Preferably the specified pause is 1 millisecond. In one embodiment, the pause is configured as small as supported by the hardware and operating system.

The throttling rate may be calculated using the following formula:

$$t = \frac{s * p}{(l - d)}$$

where:
t=Throttling Rate (Bytes)
s=Video Size (Kilobytes)
l=Video Length (Seconds)
d=Delay (Seconds)
p=Pause (Milliseconds)

The value of d may calculated as a percentage of the video length. This percentage is configurable.

For example, where the delay percentage is 5% and the video is of length 100 seconds, the video size is 100 thousand Kilobytes, and the pause is 1 millisecond, there will be a delay of 5 seconds and the throttling rate will be 1053 bytes.

In an alternative configuration, the throttling rate is predefined and the pause is calculated, for example, using the following formula:

$$p = t(l-d)/s$$

For example, given the original example, where the throttling rate is 2000 bytes, the pause will be 1.9 milliseconds Once the value of t is calculated the VT Proxy 301 release t bytes to the requesting browser 303 or device, it then checks the database 305 for a result and waits p milliseconds before it sends another t bytes. It repeats this process until a result is present. The VT Proxy 301 can modify its behaviour based on the result for example it could increase throttling, decrease throttling or terminate the connection.

Increasing the throttle effectively pauses the video until the throttle is decrease or the connection terminated. This happens because there is no data in the client's video buffer to support playback.

Decreasing the throttle will effectively allow the video to play as normal and the client's video buffer to be filled.

Terminating the connection will effectively block the video as no more data will be sent to the requesting browser 303 or device. As the video buffer only contains data a few seconds ahead of playback the video will stop playing shortly after the connection is terminated.

The Video Rating (VR) System 306 has a dedicated thread to check the database 305 for video URI's with the status Waiting To Be Scanned. When a video URI with the above status is identified it changes the status to Scanning in Progress and starts downloading 304 the video on a separate thread. If the video is greater than 480p then to improve performance the VR System 306 will attempt to download the video in 480p; if it is available or the lowest resolution above it. Once the video header is received it decodes the data using a video decoder and updates the database 305 with the video length in seconds (LengthSeconds), file size and frame rate (FR). The VR System 306 also uses the header information to calculate parameters for the scanning logic.

The VR System 306 utilises the following parameters for the scanning logic:
1. Seconds to Skip per Frame (SSF)
2. Minimum number of frames to scan—(MinFS)

3. Maximum number of frames to scan—(MaxFS)
4. Seconds either side of frame (ESF)

From the video header the VR System 306 retrieves the total size of the video in seconds which is LengthSeconds The SSF defines the gap in seconds between each frame extraction; LengthSeconds/SSF will give the total number of frames to extract (TFE). If LengthSeconds/SSF is greater than MaxFS then the TFE for scanning will equal MaxFS or if LengthSeconds/SSF is less than MinFS then the TFE for scanning will equal MinFS. If either of these are true then a new SSF is calculated as LengthSeconds/MaxFS or LengthSeconds/MinFS.

The VR System 306 has two separate modes for downloading the video data; Sequential mode and Intermittent mode In Sequential mode the VR System 306 downloads the entire video from beginning to end like a video player. This is done if the video is very short in length or the video does not support range header requests. The advantage of this mode is that it produces a minimal number of corrupt frames however the disadvantage is that it takes longer to download the data as all the data is required.

In Intermittent mode the VR System 306 only downloads chunks 307 of data at various locations along the video length based on the total number of frames to extract. The advantage of this mode is that only a fraction of the data needs to be downloaded which significantly improves the performance however the disadvantage of this mode is a higher number of corrupt frames are produced.

In Intermitted mode the following formula is used to calculate the location of each frame that is to be extracted:

File Size/Total Frames=Frame Size

Frame Size*(SSF*FR)=Bytes to Skip per Frame (BSF)

The BSF is the number of bytes to skip between each frame that is to be downloaded.

In Intermittent mode the following formula is used to calculate the size of each data chunk to be download:

Frame Size*(ESF*FR)=Data Chunk Size(DCS)

The Data Chunk Size is the number of bytes to be downloaded before and after each frame that is to be extracted.

The VR System 306 then downloads each chunk 307 of data using a "range" parameter in the http request. Once it has the required chunks 307 of data it decodes the frames from each chunk 307 using a video decoder. The VR System 306 then selects one or more frames 308 from each chunk 307 and passes it to the pornographic content recognition engine for analysis. When all the frames have been analysed the pornographic content recognition engine returns a result as to whether the video is pornographic or not. The result is written to the database 305 and the status for the URI is changed to Scanning Complete.

Embodiments of the invention may be deployed in a variety of deployment configurations including cloud, hybrid and on premise. It will be appreciated that embodiments of the invention may be implemented within software, hardware, or a combination of both.

An application program interface may be provided to facilitate interoperation by user/client devices or other systems with embodiments of the invention Cloud Deployment The cloud deployment allows the VT Proxy 301, VR System 306 and database 305 to be deployed in the cloud as a Software as a Service (SaaS) solution. Client devices are configured to browse via the cloud based proxy and no client side software is required.

Hybrid Deployment

The hybrid deployment allows for the VT Proxy 301 to be deployed on the client device or within the local network while the VR System 306 and database 305 are deployed in the cloud. The client device is configured to use the local instance of the VT Proxy 301 which communicates with the database 305 hosted in the cloud. It is also possible to deploy the VR System 306 locally and only have the database 305 deployed in the cloud.

On Premise Deployment

The on premise deployment allow for the VT Proxy 301, VR System 306 and database 305 to be deployed on the device or within the local network.

An example of an embodiment of the invention in use will now be described.

A minor connects to the Internet on a PC protected by the invention. He browses to a popular video hosting site and searches recently uploaded video for something that could be pornographic. The traditional web filter allows him to start playing the video as the site is considered legitimate.

The VT Proxy 301 identifies the response contains video data. It looks up the URI in the database 305 and it is not present therefore it adds the URI to the database 305 with a status of Waiting To Be Scanned. The VT Proxy 301 releases an initial 1000 bytes of video data to the browser 303 to maintain the connection.

The VR System 306 downloads the video header and writes the following details to the database 305:

Video length=196 seconds

It also obtains the following information from the video header:

File Size=17081 Kb (17490850 bytes)

Total Frames=4899

Frames Rate=24

The VT Proxy 301 obtains the video length from the database 305 and calculates the (t) throttling rate based on a delay (d) of 20 seconds (which is 10.3% of the video length):

$$17081/(196-20)=97$$

The value of p is 1 millisecond therefore the throttling rate is 97 bytes. The VT Proxy 301 delivers 97 bytes to the browser 303 and then pauses for 1 millisecond and then sends another 97 bytes; it continues to do this until a result is present in the database 305.

The video starts to play on the browser 303; the beginning of the video is not pornographic. So far the user's experience is unaffected.

The VR System 306 extracts the defined parameters for the scanning logic:

Seconds to Skip per Frame (SSF)=10

Minimum number of frames to scan—(MinFS)=10

Maximum number of frames to scan—(MaxFS)=40

Seconds either side of frame (ESF)=2

The VR System 306 calculates the total number of frames to be extracted (TFE):

$$196/10=19$$

The VR System 306 checks that 19 is less than 40 (MaxFS) and greater than 10(MinFS) which it is so the TFE=19.

The VR System 306 calculates the frame size:

$$17490850/4899=3570 \text{ bytes}$$

The VR System 306 calculates the bytes to skip per frame:

3570*(10*24)=856800 bytes

The following data positions are identified
856800
1713600
2570400
3427200
4284000
5140800
5997600
6854400
7711200
8568000
9424800
10281600
11138400
11995200
12852000
13708800
14565600
15422400
16279200

The VR System 306 calculates the size of data chunk to be downloaded before and after each data position:

3570*(2*24)=171360 bytes

The VR System 306 then downloads each chunk 307 of data using a "range" request in the http request. Once it has the required chunks 307 of data it decodes the frames from each chunk using a video decoder. In this case one frame 308 is selected from each chunk 307 and passed to a pornographic content recognition engine for analysis.

The pornographic recognition engine returns a result that indicates the video is pornographic. The VR System 306 writes this result to the database 305.

The VT Proxy 301 detects and extracts the result from the database 305 8 seconds into the playback of the 196 second long video and terminates the connection. The playback continues until 12 seconds at which point the video stop playing as the video buffer is empty. Therefore, the user is protected from being exposed to age restrictive material.

The user refreshes his browser 303 and tries to play the video again. The VT Proxy 301 identifies the video data and looks up the URI in the database 305. The URI is present with a result that indicates the video is pornographic and the VT Proxy 301 terminates the connection.

If the video had initially returned a result of non-pornographic the VT Proxy 301 would have decreased the throttle so that the video would have downloaded as normal and the user's experience would have remained unaffected.

Potential advantages of some embodiments of the present invention include that video streams can be analysed during transmission from a server to a video client without the video client dropping the video stream and/or within interruption to video playback. Further potential advantages include that the video content may be analysed based upon content rather than predefined blacklists or lexical analysis of metadata, video streams may be filtered for receipt by any device, user experience of non-pornographic video streaming may be unaffected, and video content analysis may be faster.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the scope of applicant's general inventive concept.

The invention claimed is:

1. A method of transmitting a video stream, including:
    a) intercepting a video stream from a server to a video client with a buffer; wherein the video client is on a user device;
    b) data rate throttling of onwards transmission of the intercepted video stream to the video client;
    c) before starting the data rate throttling of onwards transmission of the intercepted video stream to the video client, transmitting a portion of the intercepted video stream to the video client without data rate throttling;
    d) during the data rate throttling, analysing content within the video of the intercepted video stream; and
    e) performing an action in relation to the onward transmission to the video client as a result of the analysis of the content;
        wherein the video client plays-back the video from the buffer, the data rate throttling continues during the analysis of the content, the data rate throttling includes introducing a pause before onward transmission of each block of the video stream intercepted during the data rate throttling, and the pause is determined by, at least, a length of the entire video and a size of the entire video such that video playback at the video client does not slow down.

2. A method as claimed in claim 1 wherein the step of interception occurs at a proxy device between the transmission from the server to the user device.

3. A method as claimed in claim 1 wherein the step of interception occurs at the user device.

4. A method as claimed in claim 1 further comprising determining a size of the blocks in the video stream, wherein the size of the block (t) is calculated by the following formula:

$$t = \frac{s * p}{(l - d)}$$

where
    t=Block Size (Bytes)
    s=Video Size (Kilobytes)
    l=Video Length (Seconds)
    d=Delay (Seconds)
    p=Pause (Milliseconds).

5. A method as claimed in claim 4 wherein the length of the delay (d) is determined by the video length.

6. A method as claimed in claim 1 wherein the action includes one of increasing the data rate throttling of onward transmission of the intercepted video stream, decreasing the data rate throttling of onward transmission of the intercepted video stream, or blocking onward transmission of the intercepted video stream.

7. A method as claimed in claim 1 wherein the portion of intercepted video stream transmitted without data rate throttling is of a specified size.

8. A method as claimed in claim 7, wherein the specified size is at least the size of a header of the video.

9. A method as claimed in claim 1 wherein the step of analysing content includes analysing the content for pornographic content.

10. A method as claimed in claim 9 wherein the action includes blocking of the onward transmission of the intercepted video stream if the pornographic content as a result of the analysis is determined to exceed a specified threshold.

11. A method as claimed in claim 1 wherein the analysis utilises a static image analysis of at least some frames within the video.

12. A method as claimed in claim 1 further including the step of requesting a second transmission of the video from the server; wherein the analysis is performed on the content of the video within the second transmission.

13. A non-transitory computer readable recording medium having recorded thereon a computer program for implementing the method of claim 1.

14. The method as claimed in claim 1, wherein the action includes increasing the data rate throttling of onward transmission of the intercepted video stream.

15. The method as claimed in claim 1, wherein the action includes replacing the intercepted video stream with another video stream.

16. A system for transmission of a video stream, including:
    a communications apparatus configured to intercept a video stream from a server to a video client with a buffer on a user device;
    a first processor configured to:
        data rate throttle of onwards transmission of the intercepted video stream to the video client with the buffer on the user device;
        before starting the data rate throttling of onwards transmission of the intercepted video stream to the video client, transmit a portion of the intercepted video stream video client without data rate throttling; and
        perform an action in relation to the onward transmission to the video client as a result of analysis of content within the video of the intercepted video stream; and
    a second processor configured to, during the data rate throttling, analyse the content within the video of the intercepted video stream;
    wherein the video client plays-back the video from the buffer and the first processor is configured to continue the data rate throttling of the onward transmission of the intercepted video stream during analysis of the content of the intercepted video stream by the second processor, the date rate throttling includes introducing a pause before onward transmission of each block of the video stream intercepted during the data rate throttling, and the pause is determined by, at least, a length of the entire video and a size of the entire video such that video playback at the video client does not slow down.

17. A system as claimed in claim 16, further including a further communications apparatus configured for receiving a second transmission of the video from the server; wherein the second processor analyses the content within the video of the second transmission.

18. A system as claimed in claim 16, wherein the first processor exists within the user device.

19. A system as claimed in claim 16, wherein the second processor exists within the user device.

20. A system as claimed in claim 16, wherein the first processor is configured to request analysis of the video from the second processor and wherein the second processor analyses the video in response to the request.

21. A system as claimed in claim 20, wherein the requests are stored within a database and wherein the second processor is configured to extract the requests from the database.

22. A user device configured for use with the system of claim 21.

23. A processor configured for use with the system of claim 16, wherein the processor is configured to data rate throttle onwards transmission of a video stream to a video client on a user device and to perform an action in relation to the onward transmission to the video client as a result of analysis of content of the video of the video stream.

24. A processor configured for use with the system of claim 16, wherein the processor is configured to analyse the content within the video of the video stream.

25. A user device configured for use with the system of claim 16.

26. A method of transmitting a video stream, comprising:
    intercepting a video stream from a server to a video client; wherein the video client is on a user device;
    data rate throttling of onwards transmission of the intercepted video stream to the video client;
    before starting the data rate throttling of onwards transmission of the intercepted video stream to the video client, transmitting a portion of the intercepted video stream to the video client without data rate throttling;
    analysing content within the video of the intercepted video stream, during data rate throttling of onwards transmission of the intercepted video stream to the video client; and
    performing an action in relation to the onward transmission to the video client as a result of the analysis of the content;
    wherein the data rate throttling continues during the analysis of the content and the action includes increasing the data rate throttling of onward transmission of the intercepted video stream or decreasing the data rate throttling of onward transmission of the intercepted video stream based on the result of the analysis of the content.

27. The method of claim 26, wherein the data rate throttling includes introducing a pause before onward transmission of each block of the intercepted video stream, and the pause is determined by length of the entire video and size of the entire video.

28. A system for transmission of a video stream, comprising:
    a communications apparatus configured to intercept a video stream from a server to a video client on a user device;
    a first processor configured to:
        data rate throttle onwards transmission of the intercepted video stream to the video client on the user device;
        before starting the data rate throttling of onwards transmission of the intercepted video stream to the video client, transmit a portion of the intercepted video stream to the video client without data rate throttling; and
        perform an action in relation to the onward transmission to the video client as a result of analysis of content within the video of the intercepted video stream; and
    a second processor configured to analyse the content within the video of the intercepted video stream, during the data rate throttling of onward transmission of the intercepted video stream to the video client;

wherein the first processor is configured to continue the data rate throttling of the onward transmission of the intercepted video stream during analysis of the content of the video of the intercepted video stream by the second processor and the action includes increasing the data rate throttling of onward transmission of the intercepted video stream or decreasing the data rate throttling of onward transmission of the intercepted video stream based on the result of the analysis of the content.

29. The system of claim 28, wherein the data rate throttling includes introducing a pause before onward transmission of each block of the intercepted video stream, and the pause is determined by length of the entire video and size of the entire video.

* * * * *